United States Patent

[11] 3,604,485

| [72] | Inventor | Wilheim Schelkmann |
| | | Witten (Ruhr), Germany |
| [21] | Appl. No. | 755,150 |
| [22] | Filed | Aug. 26, 1968 |
| [45] | Patented | Sept. 14, 1971 |
| [73] | Assignee | Vakuum Vulk Holdings Ltd. |
| | | Nassau, Bahamas |
| [32] | Priority | Sept. 1, 1967 |
| [33] | | Germany |
| [31] | | Sch 416,248 |

[54] TIRE-HOLDING DEVICE
5 Claims, 4 Drawing Figs.

[52] U.S. Cl. ..................................... 144/288 A,
152/384
[51] Int. Cl. .................................... B29b 17/00
[50] Field of Search ........................... 144/288;
157/13; 152/384

[56] References Cited
UNITED STATES PATENTS

| 1,566,028 | 12/1925 | Macklin | 152/384 |
| 2,280,568 | 4/1942 | Brown | 182/384 X |
| 2,848,279 | 8/1958 | Parker | 152/384 X |

FOREIGN PATENTS

| 29,050 | 9/1930 | Australia | 152/384 |
| 200,019 | 10/1958 | Austria | 152/384 |

*Primary Examiner*—Donald R. Schran
*Attorney*—Michael S. Striker

ABSTRACT: A device for holding vehicle tires having a bead. The device includes a disc-shaped mounting member on which the tire is to be mounted, and this mounting member is provided with a substantially frustoconical projecting portion over which the tire bead is to be placed. The projecting portion has an external circumferential frustoconically tapering surface against which the bead is to abut and this surface is provided with a plurality of circumferentially distributed facets.

PATENTED SEP 14 1971 3,604,485

INVENTOR
Wilhelm Schalkmann
BY
Michael J. Striker
ATTORNEY

TIRE-HOLDING DEVICE

BACKGROUND OF THE INVENTION

The present invention relates generally to tire holding devices, and more particularly to devices which must be capable of holding tires of different diameters.

Such devices are needed for centering and holding tires in certain tire-processing machines, for instance tire-treading machines, tire-grooving machines and the like. The problem with such machines heretofore has been the fact that, aside from the different sizes of the tires which must be accommodated on such machines, tires of the same size may be different diameters because of the permissible tolerance variations in the manufacture of tires. This is also true of tires of identical nominal size but which are manufactured by different manufacturers. These differences create problems insofar as they prevent the tire from being properly centered and held on the tire-mounting or tire-holding device. When this is the case, however, any work performed on the tire—such as grooving, retreading or the like—results in the tire becoming out of round. It need not be emphasized that this is not desirable.

Accordingly, it is an object of the present invention to overcome these disadvantages.

A more particular object of the present invention is to provide a tire holding device wherein tires whose diameter varies as a result of manufacturing tolerances and for analogous reasons are properly centered and held in position.

An equipment of the type which can utilize the present invention is described and illustrated in the Swiss Pat. No. 366,666.

SUMMARY OF THE INVENTION

In accordance with the above objects, and others which will become apparent hereafter, one feature of my invention resides in the provision of a holding device for holding vehicle tires which are provided with a bead. My device includes a disc-shaped mounting member provided with a substantially frustoconical projecting portion over which the tire bead is to be placed. This projecting portion has an external circumferential frustoconically tapering surface against which the bead is to abut, and in accordance with the invention the surface is provided with a plurality of circumferentially distributed facets. Thus, in a plan view of the frustoconically tapering projection, as seen in direction opposite the taper, the circumferential surface which is of course an annular surface, would be of polygonal outline. This configuration compensates for diameter variations in tires which are to be mounted on the holding device so that such tires, as a result of the internal air pressure existing in them, will be in centered abutment with the flange of the holding device and will not become out of round when undergoing treatment.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a fragmentary section through a device embodying my invention as illustrated in FIG. 1a.

DESCRIPTION OF THE PREFERRED EMBODIMENTS

Figure 1B:
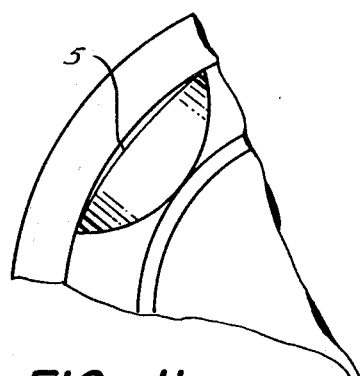
FIG. 1b is a view similar to FIG. 1a but illustrating a modified embodiment.
Figure 1A:
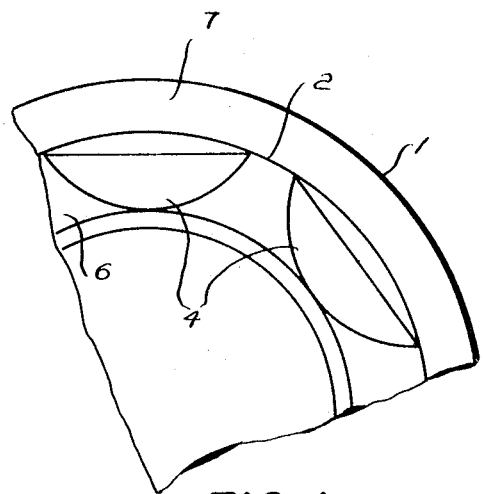
FIG. 1a is a fragmentary front elevational view of a mounting member according to my invention.
Figure 2:
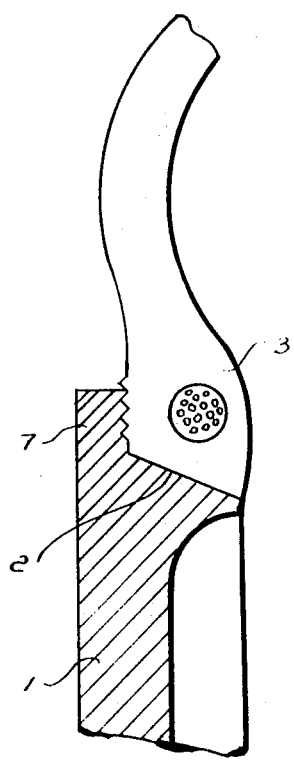

Discussing now the drawing in detail, and firstly FIG. 1a thereof, it will be seen that reference numeral 1 identifies a disc-shaped mounting member in a tire-holding device of known construction. This mounting member 1 is provided with a frustoconical projecting portion over which the tire bead 3 is to be placed, and the projecting portion has an external circumferential frustoconically tapering surface 2 which, it will be appreciated, is an annular surface. At the base of the projecting portion there is a flange 7 (compare also FIG. 2) against which the tire bead 3 is pressed by the air pressure prevailing in the interior of the tire.

In accordance with the present invention, the annular external circumferential frustoconically tapering surface 2 is not smooth, as is conventional, but rather is provided in polygonal form. In FIG. 1a this is achieved by providing it with a plurality of circumferentially distributed facets 4 which may be planar as shown in FIG. 1a, or which may be somewhat convex as identified with reference numeral 5 in FIG. 1b. This may be accomplished by suitable material removal and the facets 4 or 5, which may of course both be provided on one of the same surface is desired, may either be directly adjacent one another without any spacing, or they may be spaced as indicated in FIGS. 1a and 1b, that is circumferentially distributed in such manner that portions 6 of the frustoconically tapering circumferential surface remain between adjacent ones of the facets 4 and/or 5.

Figure 3:
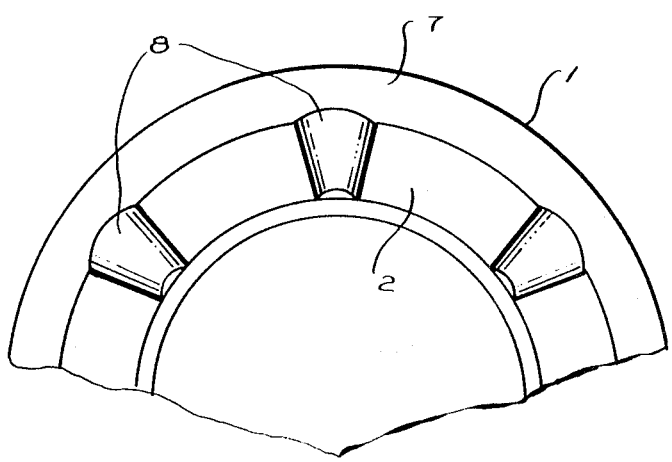
FIG. 3 is a view similar to FIGS. 1a and 1b, but illustrating another embodiment of the invention.

As shown in FIG. 3, finally, the necessary facets can also be provided by providing the surface 2 with a plurality of "bumps," here shown as longitudinally halved frustoconical elements 8 suitably secured on the surface 2 or, alternately, formed integrally thereon by suitable material removal techniques wherein material is removed intermediate circumferentially adjacent ones of the facets 8 until the same project upwardly from what has become the surface 2. Naturally, the members or elements 8 could be of different configuration than what is shown.

By resorting to my present invention there will be an automatic compensation provided for variations in the diameter of tires which are to be mounted on the mounting element or mounting member constructed in accordance with my invention, and the problems outlines earlier with respect to existing devices of the type under discussion are avoided.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a holding device for holding vehicle tires provided with a bead, a disc-shaped mounting member provided with a substantially frustoconical projecting portion over which the tire bead is to be placed, said projecting portion having an external circumferential annular face which forms part of a conical surface and is provided with a plurality of circumferentially arranged facets located inwardly spaced from said conical surface and forming with said annular face respective centering edges for guiding said bead into centered position.

2. In a holding device as defined in claim 1, wherein said facets are constituted by planar surface portions provided on said frustoconically tapering circumferential surface.

3. In a holding device as defined in claim 1, wherein said facets are constituted by convexly curved surface portions provided on said frustoconically tapering circumferential surface.

4. In a holding device as defined in claim 1, wherein said circumferentially distributed facets are closely adjacent to one another.

5. In a holding device as defined in claim 1, wherein adjacent ones of said circumferentially distributed facets are spaced from one another so that unobstructed portions of said frustoconically tapering surface remain intermediate adjacent ones of said facets.